July 30, 1963             A. C. MUELLER             3,099,198
AUTOMATIC EXPOSURE CONTROL FOR PHOTOGRAPHIC CAMERAS
Filed June 27, 1958                             3 Sheets-Sheet 1
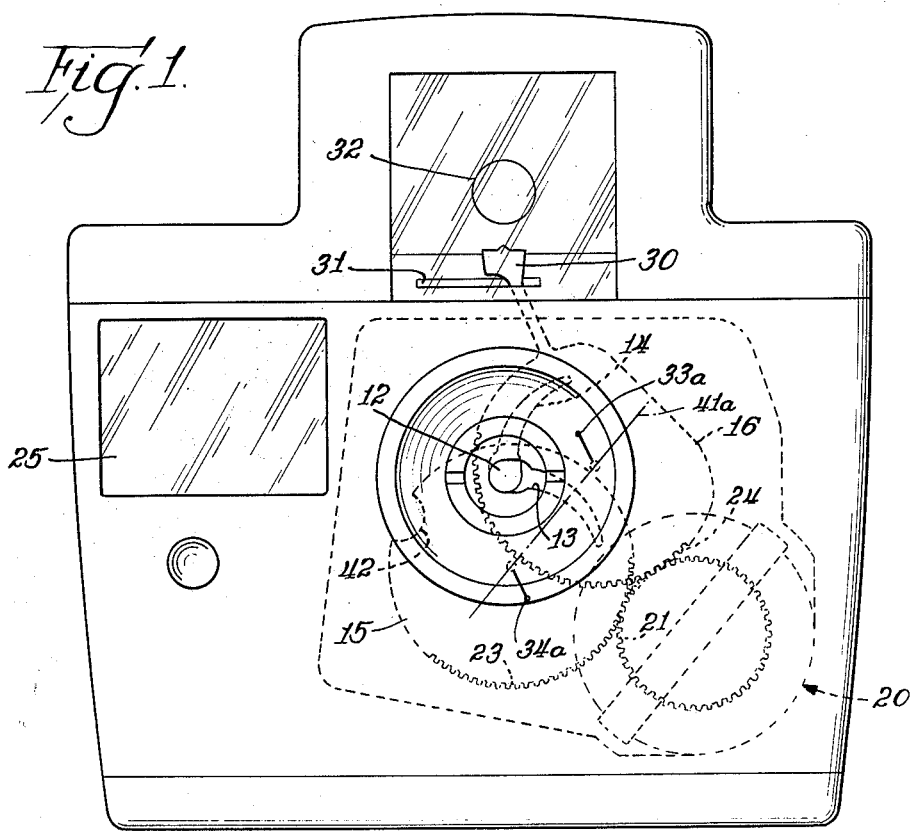
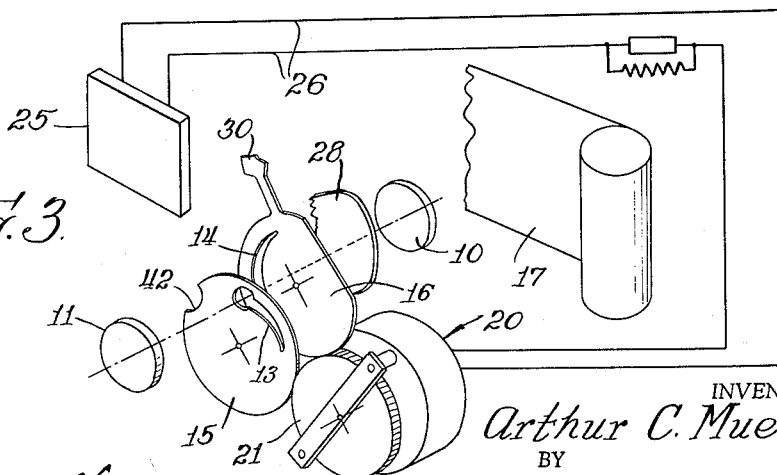
INVENTOR.
Arthur C. Mueller July 30, 1963 A. C. MUELLER 3,099,198
AUTOMATIC EXPOSURE CONTROL FOR PHOTOGRAPHIC CAMERAS
Filed June 27, 1958 3 Sheets-Sheet 2
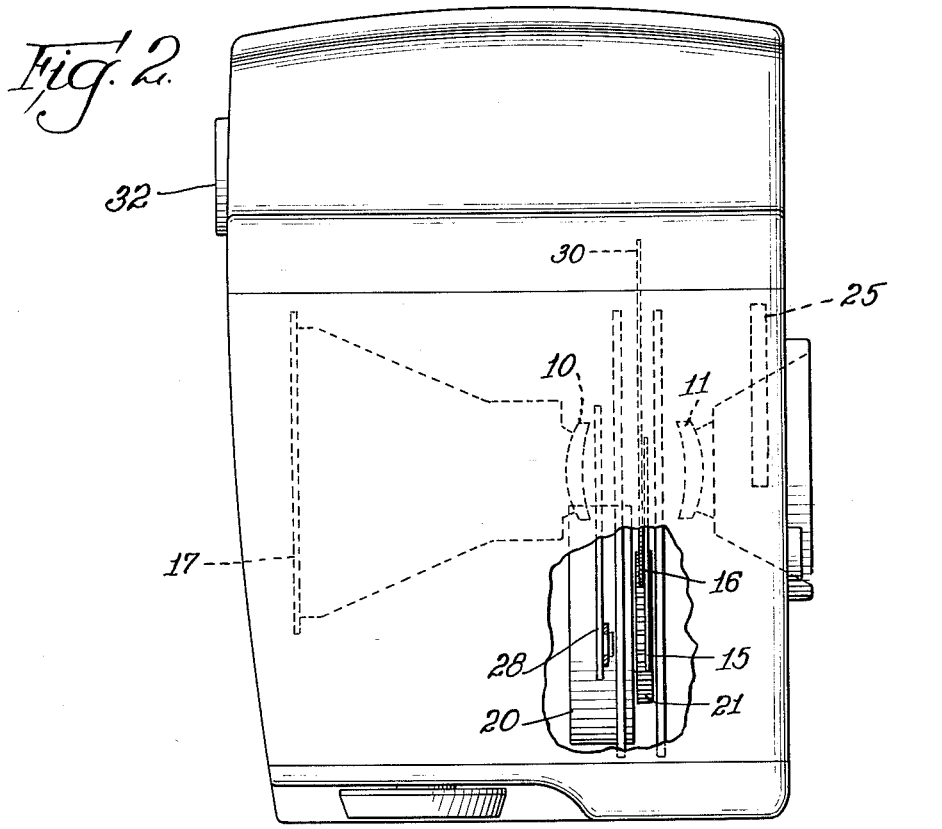
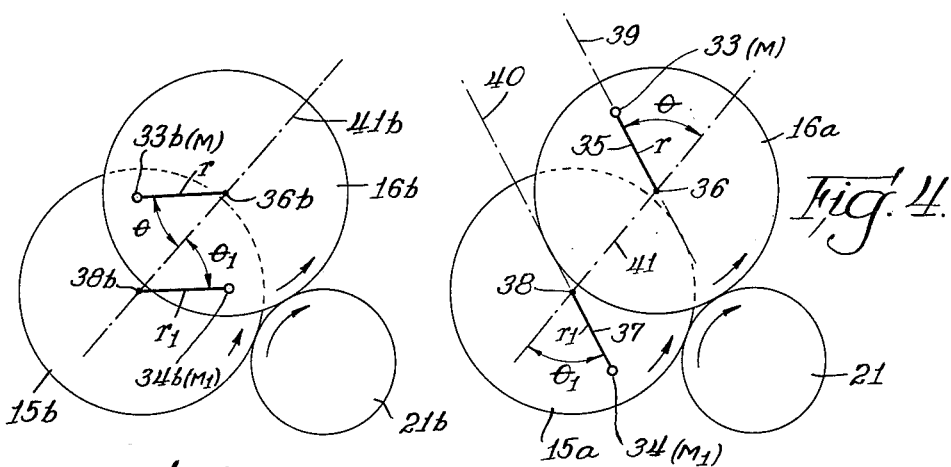
INVENTOR.
Arthur C. Mueller INVENTOR.
Arthur C. Mueller United States Patent Office 3,099,198
Patented July 30, 1963

3,099,198
AUTOMATIC EXPOSURE CONTROL FOR
PHOTOGRAPHIC CAMERAS
Arthur C. Mueller, Maine Township, Cook County, Ill.,
assignor to Bell & Howell Company, Chicago, Ill., a
corporation of Illinois
Filed June 27, 1958, Ser. No. 744,998
10 Claims. (Cl. 95—64)

The present invention relates to apparatus for adjusting the exposure of a photographic camera to provide automatically and in a rapid manner, proper exposure of the film therein under varying light conditions.

In presently copending application entitled "Exposure Control for Photographic Cameras," Serial No. 677,865, filed August 13, 1957, now Patent No. 2,841,064, the details of an improved exposure control for photographic cameras were fully set forth. In that application electrical energy from a photoelectric cell was directly applied to an electrical galvanometer which, in turn, was directly coupled to an adjustable diaphragm mechanism. In order to provide extremely rapid response of the diaphragm to changes in electrical output of the photoelectric cell in such a directly coupled system, a novel diaphragm mechanism employing a pair of overlapping rotating diaphragm or iris blades simultaneously directly driven by a single gear connected to the galvanometer is used. Undesirable movements of the diaphragm members in response to rotational accelerations applied to the camera were effectively eliminated from the diaphragm system there shown by providing a substantial rotary inertia balance between the various counterrotating parts of the diaphragm and galvanometer mechanism. Additionally, in order to prevent undesired oscillations of the diaphragm members in response to gravitational pull or other linear acceleration forces, the various rotary components of the adjustable diaparagm, for example the galvanometer meter coil, galvanometer driven gear and the iris blades, were each statically or rotationally approximately balanced. In such a balanced system movements caused by external forces applied to the camera were substantially eliminated and a superior automatically adjusted diaphragm was achieved in which the diaphargm blades were extremely sensitive ot movement by the galvanometer but, at the same time, were substantially insensitive to external acceleration-producing forces.

In the apparatus shown in the above-mentioned copending application, the diaphragm blades were substantially circular in configuration and hence were very easily statically balanced. However, it has been found that in certain commercial applications of the general system illustrated in said application, it is extremely desirable that asymmetrical shapes be employed for the diaphragm blades. In such situations it becomes extremely difficult, if not practically impossible, to statically balance the diaphragm blades to a satisfactory degree. In accordance with the principles of the present invention an unbalance in one or more of the rotating members of the diaphragm and galvanometer drive system may be provided and counteracted by an unbalance elsewhere in the rotating system without materially affecting operation of the adjustable diaphragm system as a whole and, further, without rendering the system subject to unbalanced gravitational forces, normally considered unavoidable where unbalance of any sort is present.

In accordance with the principles of the present invention a camera is provided having an adjustable exposure diaphragm comprising a plurality of overlapping diaphragm members having apertures therein co-operating to provide an adjustable exposure aperture. The diaphragm members are directly connected to each other and are driven by a rotary drive member directly driven or coupled to a galvanometer which is, in turn, preferably directly actuated by the electrical output of a photoelectric cell positioned to intercept light rays emanating from the object being photographed or reflected therefrom. In the structure of the present invention at least one of the diaphragm members is constructed with an unbalance in order to provide a convenient indicator means and this unbalance is counterbalanced by an eccentric mass rotatably connected to the diaphragm. As will be set forth in more detail below, the provision of a counterbalancing eccentric mass is accomplished without modifying the stability of the over-all rotating system by positioning the eccentric center of mass 180° out of phase with the center of mass of the unbalanced diaphragm member such that a radius line drawn through the center of mass of the counter balance and its center of rotation is constantly substantially parallel to a line drawn through the center of mass of the unbalanced diaphragm member and its center of rotation. By thus carefully positioning the counterbalance mass an intentionally unbalanced diaphragm member or members may be employed when desired while still retaining a substantially completely balanced over-all system unaffected by externally applied accelerations, including the force of gravity.

It is, accordingly, an object of the present invention to provide an improved automatically adjustable exposure diaphragm for hand manipulated cameras or the like.

Another object of the present invention is to provide an effectively balanced adjustable diaphragm mechanism wherein at least one of the diaphragm members is statically unbalanced.

Still a further object of the present invention is to provide a photographic camera having an adjustable diaphragm rotationally driven by a galvanometer energized by the output of a photoelectric cell and wherein a static unbalance in one or more of the rotating parts is effectively counterbalanced to provide an over-all rotationally balanced diaphragm system.

Still a further object of the invention is to provide a method of effectively counterbalancing any unbalance in a rotary adjustable diaphragm system for hand held cameras or the like to negative the effect of gravity or external accelerations, on the system.

Yet another object of the invention is to provide a novel and improved photographic camera employing an indicating apparatus directly mounted on a rotatable diaphragm blade, for indicating the position of the diaphragm, without adversely affecting the balance of the over-all diaphragm and diaphragm actuating system.

Still other and further objects and features of the present invention will at once become apparent to those skilled in the art from a consideration of the drawings wherein a preferred embodiment of the invention is shown by way of illustration only, and wherein:

FIGURE 1 is a front elevational view of a photographic camera embodying the principles of the present invention;

FIGURE 2 is a side elevational view of the camera illustrated in FIGURE 1;

FIGURE 3 is a diagrammatic, exploded, view of the internal components of the photographic camera illustrated in FIGURES 1 and 2 and illustrating the relationship of the working parts thereof;

FIGURE 4 is a line drawing representing the diaphragm blades and the drive mechanism therefor, and a vector representation of the unbalanced condition therein;

FIGURE 5 is a modified form of the invention embodied in a diagrammatic illustration similar to that of FIGURE 4;

As shown on the drawings:

Figure 6:
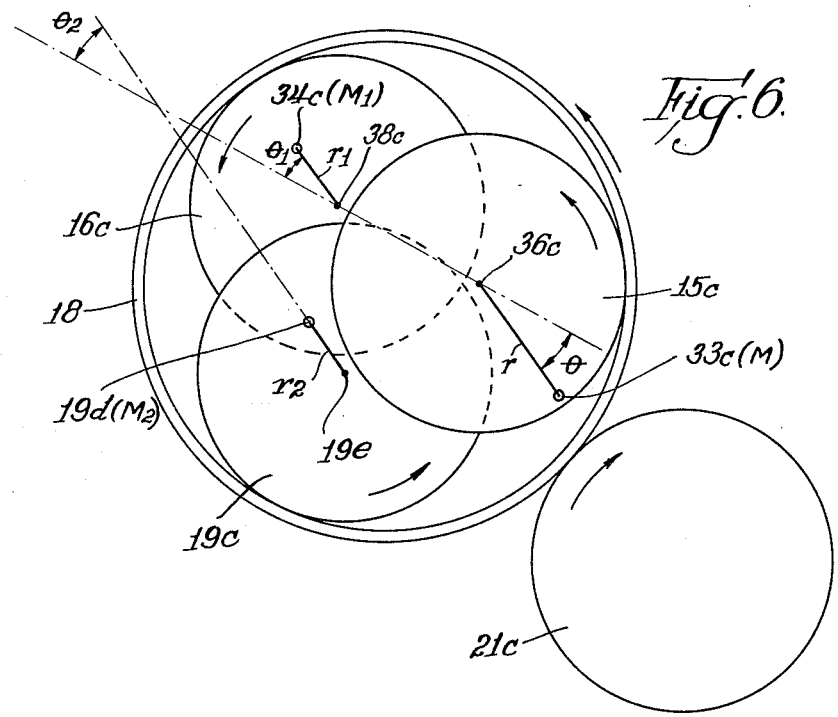
FIGURE 6 is a further diagrammatic illustration of a modified form of counterbalanced system.

As shown in FIGURES 1 and 2, a hand held photographic camera is provided having a forwardly facing lens comprising spaced optical lenses 10, 11 positioned to transmit light past a diaphragm aperture 12 defined by overlapping apertures 13 and 14 in diaphragm disks 15 and 16 respectively. The light passing the lense 10, 11 and the diaphragm aperture 12 impinges on film diagrammatically illustrated at 17 positioned in the focal plane of the combined lens 10, 11 in any conventional manner forming no part of the present invention.

The diaphragm blades 15 and 16 are automatically actuated, in accordance with the present invention, by a galvanometer generally indicated at 20 directly driving galvanometer gear 21 which is in turn directly geared to the diaphragm blades 15 and 16 by the segmental geared tooth sections 23 and 24 respectively. The energy employed for actuation of the gear 21 by galvanometer 20 is obtained from a photoelectric cell 25 preferably integrated into the camera unit in the forwardly facing surface thereof. The over-all diaphragm actuating system is diagrammatically illustrated in FIGURE 3 where photoelectric cell 25 is connected by leads 26 to galvanometer 20 which drivingly co-operates with diaphragm blades 15 and 16 via drive gear 21. Adjustments of the diaphragm blades modify the light passing through lenses 10, 11 for impingement on film 17. The duration of the exposure is controlled by means of a shutter mechanism diagrammatically illustrated at 28 which may be of any conventional form but which is, in the embodiment illustrated, positioned between the two lens elements 10 and 11.

It is desired that some means for appraising the operator of the camera when the lens diaphragm blades 15 and 16 are in position of maximum aperture, as shown in FIGURE 1. In accordance with the principles of the present invention an extremely simple construction is provided for accomplishing that function. As may be seen from FIGURE 1, an indicating flag 30 is provided in the form of an extension on diaphragm blade 16. When the maximum aperture 12 is provided, or in other words, when the widest portions of slots 13 and 14 overlie the lens opening of the camera, the flag 30 moves arcuately up through slot 31 in the camera viewfinder where it may be directly viewed by the camera operator upon looking through the viewfinder lens 32 at the rear of the camera housing.

A consideration of the flag 30 indicates simultaneously its extreme desirability and its unbalancing effect relative to the diaphragm blade 16. Obviously, the further the distance the flag 30 must extend beyond the periphery of the blade 16 in order to permit its positioning directly in the line of sight in the viewfinder, the greater an unbalance is provided. Depending upon the specific construction and layout of the camera, this unbalance will vary relative to the position of the generally arcuate aperture slot 14, in order to permit the flag 30 to move into the most convenient position. Accordingly, means are provided in accordance with the present invention for enabling construction of the diaphragm blade 16 in any convenient manner, including, if desired, an unbalanced condition, without adversely affecting the operation of the camera as a whole.

As discussed in the above mentioned earlier copending application, Serial No. 677,865, and as pointed out hereinabove, satisfactory operation of a hand held camera employing an adjustable diaphragm aperture directly driven from a photoelectric cell, requires that the rotating system comprising the diaphragm blades and the galvanometer be not only approximately inertia balanced but also effectively gravitationally balanced. While in many instances the simplest way to achieve such balance is to provide individually independently rotationally balanced components, nevertheless it will be immediately apparent that aggravated conditions of unbalance such as suggested by the provision of an extended flag portion 30, require different construction, if at all possible. This is particularly true where the structural housing limitations of the camera will prevent the application of counterbalancing weights to diaphragm blade 16 opposite to the position of the flag 30. Further, it is desired, as pointed out in said copending application, that the total weight of the individual diaphragm members be minimized in order to minimize the inertia of the blade to changing signals from the photoelectric cell.

If, as above suggested, counterbalancing cannot practically be achieved through the addition of weights to the blade 16 on the opposite side of the pivot thereof from the flag 30, some outer counterbalancing technique must be employed. It has been discovered that an effective counterbalance may be achieved by providing a counterweight or unbalance in a rotating mass coupled to the system at a point remote, if desired, from the initially unbalanced blade 16. One convenient solution is diagrammatically illustrated in FIGURE 4. There, a galvanometer driven drive gear 21 is directly drivingly associated with the periphery of a pair of rotating disks 15a and 16a. The disk 16a is intentionally unbalanced providing its center of gravity at 33 which represents, for example, the counterbalance imposed on the disk 16 by the flag 30. Upon a consideration of the diagram shown in FIGURE 4, it will be seen that disks 15a and 16a rotate in the same direction simultaneously. Accordingly, if it is desired that the system be gravitationally balanced, disk 15a may be provided with a counterbalancing weight 34 acting in direct opposition to the unbalance 33. This opposition may clearly be seen from FIGURE 4 wherein the center of gravity 33 is shown to have an effective lever arm 35 relative to the center of rotation 36 tending to rotate the disk 16a in a counterclockwise direction. However, at the same time, the similar unbalance at 34 of disk 15a acts through a lever arm 37 relative to pivot 38 to urge the disk 15a in a clockwise direction. Since the disks 15a and 16a are directly coupled to gear 21 and are mounted for rotation in the same direction, the oppositely acting forces cancel each other and no tendency is present for the combined system comprising disks 15a, 16a and gear 21 to rotate.

A consideration of the unbalanced situation illustrated in FIGURE 4 leads to the observation that the positions of the respective unbalances 33 and 34 relative to their respective centers of rotation 36 and 38 control the balance characteristic of the system. The relation clearly must remain constant in all positions of tilting of the system comprising the disks 15a, 16a and gear 21 in order to eliminate gravitational influence on the system when the camera is tilted. This constant relationship may readily be achieved by directly relating the unbalances to each other. This in turn is accomplished by drawing a line between the centers 36 and 38 of rotation of the unbalanced and counterbalancing disks. A reference line is then drawn through the unbalanced center of gravity 33 and the center of rotation 36. Since the disks 15a and 16a rotate simultaneously and in the same direction it is clear that an unbalance positioned on a line parallel to the line thus formed between the center of gravity 33 and center 36 will, if the same distance from the center of rotation 38, provide a horizontal lever arm changing directly as the lever arm 35 changes with rotation of disks 16a. In order to provide a lever arm opposite in direction to the lever arm 35, it is necessary that the center of gravity or counterbalance 34 be positioned on the parallel line 40 on the side of the center 38 opposite to the side upon which the unbalance 33 is found or, in other words, 180° out of phase therewith. With the arrangement thus described any rotation of the gear 21 will cause movement of the unbalances 33 and 34 simultaneously with increases or decreases in opposed lever arms depending upon the direction of rotation of the gear 21. Any pivoting of the entire system comprising disks 15a, 16a and gear 21 likewise causes simultaneous movement of the unbalances 33 and 34 with simultaneously increasing or decreasing opposed effective lever arms about the axes 36 and 38.

It will, of course, be apparent to those skilled in the art that the effective torque applied to the disk 16a tending to rotate it as a result of the unbalance 33 is directly proportional to the magnitude of the unbalanced weight as well as its effective lever arm distance from the center of rotation. Accordingly, while the counterbalance 34 may be of equal magnitude and equal distance from the center of rotation to thereby provide equal torque, it may alternatively be of greater magnitude at a proportionately lesser distance from the center of rotation or of lesser magnitude and proportionately greater distance.

It will be observed that since disks 15a and 16a are directly geared to rotate simultaneously, the relative positions of the unbalances 33 and 34 remain constant relative to the line 41 drawn through the centers 36, 38. Since, as above noted, the lines 39 and 40 are parallel, rotation of disks 15a and 16a will, if continued, cause the lines 39 and 40 to merge to the center line 41, in which condition the counterweights 33 and 34 would repose on the center line 41 on opposite sides of the centers 36, 38. In spotting the position of a satisfactory counterbalancing weight on the disk 15a, this in-line condition may be conveniently utilized. Thus, disks 16a and 15a may be positioned by rotation of gear 21 until the unbalance 33 coincides with the center line 41, on either side of the pivot 36. With the parts in this position an equivalent counterweight may be placed on the disk 15a on the center line 41 on the opposite side of the center 38 from the position of the unbalance 33 relative to the center 36. This may readily be done graphically when designing the diaphragm system and accuracy of alignment of the unbalances may readily be assured without necessity of equipment capable of accurately providing exactly parallel lines such as 39 and 40.

Referring again to the specific form of the invention shown in FIGURES 1, 2 and 3, it will be seen that the flag 30 provides an unbalance positioned approximately at 33a on disk 16. As a result of the relationship above set forth it will be apparent that to provide counterbalancing in the disk 15, a counterbalance weight must effectively be placed at 34a. This may be achieved by the addition of a weight at the position 34a or, alternatively, by the removal of weight from the disk 15a at some point which will effectively provide shift of the center of gravity of disk 15 to the point 34a. In practice it is preferred that the latter technique be employed since removal of weight from the disk 15 at some point will decrease the inertia of the parts thereby improving the sensitivity of the diaphragm to variations in electrical output of the photoelectric cell 25, rather than undesirably increasing the inertia. Since some weight has been removed in the form of the arcuate slot 13, it has been found that the removal of additional weight at 42 will provide a shift of the center of gravity to 34a to effectively counterbalance the eccentric center of gravity 33a. With the system thus arranged, the members 15 and 16 are individually internally unbalanced but the over-all system comprising diaphragm blades 15 and 16 and the drive gear 21 is effectively balanced against gravitational influence. As above pointed out, since rotation of the disks 15 and 16 is in the same direction and the weights 33a and 34a are 180° out of phase relative to the center line 41a, the components remain in effective counterbalance independently of rotation of the gear 21 by the galvanometer 20 or tilting of the entire camera as a unit.

It will be appreciated that by providing gravitational counterbalance as above described, the need for inertia balance is not eliminated. As pointed out in the above-identified copending application Serial No. 677,865, the inertia of the oppositely rotating parts, i.e., the galvanometer 20 and gear 21 as opposed to disks 15 and 16 should be approximately equal and in opposition. With such approximate inertia balance, rotational accelerations applied to the camera will not affect the size of the aperture 12 and, in view of the 180° phase relationship above-described relative to the centers of gravity 33a and 34a, linear accelerations applied to the camera in any direction will act in opposition at the point of connection of the members 15 and 16 to the gear 21 to lock the members against rotation in the same manner as the force of gravity which is, of course, merely a vertical linear acceleration producing force.

The diagrammatic illustration shown in FIGURE 5 is essentially the same as that in FIGURE 4 except that the eccentric centers of gravity 33b and 34b are positioned in different final position of rotation relative to the center line 41b. As there shown it will be seen that the unbalances 33b and 34b are on opposite sides of their respective centers 36b, 38b relative to the center line 41b and that lines drawn through the eccentric centers of gravity and their respective centers of rotation are parallel to each other, as in the case illustrated in FIGURE 4. By relating the eccentric centers of gravity to the center line 41b the mathematical relationship between the centers of gravity required to provide rotational balance against linear accelerations may be illustrated.

As above noted, the effective lever arm of the eccentric center of gravity of any rotational part relative to any reference line passing through the center of rotation or parallel to a line passing through the center of rotation will vary with the mass of the unbalance, its radius from the center of rotation and its angular position relative to the reference line. Obviously, considering FIGURE 5, it will be seen that the effective unbalance relative to reference line 41b, of the eccentric center of gravity 33b, will equal $Mr \cos \theta$ where M equals the mass of the eccentric center of gravity 33b, r equals the radius from the eccentric center of gravity to the center of rotation and $\theta$ equals the angle between the line r and the reference line 41b. Likewise, relative to the center line 41b the counterbalance 34b, designated $M_1$ provides an effective unbalance proportional to its mass, its radius $r_1$, and its angle $\theta_1$ relative to the reference line 41b. Thus, the effective unbalance relative to the reference line 41b of the counterbalance 34b will equal $M_1 r_1 \cos \theta_1$. Since $\theta_1$ equals $-\theta$ with reference to the reference line 41b the two unbalances act equally and oppositely relative to their centers of rotation and accordingly balance each other. This relationship, mathematically, obviously comprises the equation $Mr \cos \theta + M_1 r_1 \cos \theta_1 = 0$, the cosines $\theta$ and $\theta_1$ being opposite in sign. As above noted this balance relationship may be retained with varying weights and radiuses as long as the relationship between the weights and radius remain as prescribed by the equation noted.

The discussion of the paragraph above clearly relates to the instantaneous effective balancing of the system. If the parts 16b, 15b and 21b were to rotate the factor $\cos \theta$ and $\cos \theta_1$ will manifestly vary with such rotation. However, if the parts are assembled initially with the lines r and $r_1$ parallel and $\theta$ and $\theta_1$ opposite in sign, the factor $Mr \cos \theta$ will constantly be equal, but opposite to the factor $M_1 r_1 \cos \theta_1$ independently of the position of rotation of the parts 16b and 15b as long as they rotate simultaneously.

In the above discussion the effective unbalance was related to the line 41b for purposes of illustration. However, it will be evident that with the parts arranged as shown in FIGURES 4 and 5, any reference line whatever may be used without in any way modifying the relationship between the components. Since the lines r and $r_1$ are parallel to each other they will invariably bear the same angular relationship relative to any base reference line and hence the factor $\cos \theta$ will always equal in magnitude $\cos \theta_1$. Likewise, when related back to the center of rotation, about which the unbalance force must always act, it will be seen that independently of the position of the base line, the unbalance will always be on opposite sides of the respective centers of rotation so that the effective $Mr \cos \theta$ and $M_1 r_1 \cos \theta_1$ will be of opposite sign and hence balance each other.

The fact that any base line may be employed as a reference indicates, of course, that the system is stable in all directions and is, accordingly, not subject to changes upon the application of linear acceleration forces in any position of tilting of the camera or in any position of rotation of the respective system parts. Likewise, since any reference line may be utilized it will be understood that more than two interconnected rotary members may be balanced as long as the effective sum of $Mr \cos \theta = 0$. This is illustrated in FIGURE 6 wherein a further modified form of the invention is shown.

As may be seen in FIGURE 6, a plurality of rotating disks, or diaphragm blades as the case may be, are provided. These disks, numbered 15c, 16c and 19c are connected for simultaneous rotation in the same direction by means of an annular ring gear 18 driven by gear 21c. If it be assumed, for purposes of illustration that the gear 15c has unbalanced center of gravity indicated at 33c relative to its axis of rotation 36c, this unbalance may be effectively balanced by a single unbalanced center of gravity on the disk 16c in the manner discussed relative to FIGURES 4 and 5. However, alternatively, the unbalance of disk 15c may be overcome by cumulative counterbalances applied to disks 16c and 19c. For purposes of explanation a reference line passing through the centers 36c and 38c of the respective disks 15c and 16c will be employed. If a counterbalance 34c is positioned on the disk 16c and a line passing through the center of rotation 38c thereof and parallel to the line passing through the unbalance center of gravity 33c and the center of rotation 36c, and on the opposite side of the center 38c from the position of the unbalance 33c relative to its center 36c, the counterbalance 34c will partially balance the unbalance 33c in any position of rotation of the parts. The remaining portion of unbalance may be provided on the disk 19c in the form of a counterbalance weight 19d positioned on the same side of center 19e as the counter weight 34c is relative to its center 38c. The line passing through the unbalance 19d and center 19e is arranged parallel to the line passing through the unbalance 33c and the center 36c and an extension thereof will cross the reference line at the same relation thereto as the line passing through counterbalance 34c and center 38c. In the arrangement shown it will be seen that $Mr \cos \theta = M_1 r_1 \cos \theta_1 + M_2 r_2 \cos \theta_2$ and that the sign of $\theta_1$ and $\theta_2$ is opposite to that of $\theta$ so that $\Sigma Mr \cos \theta = 0$ where $\theta$ is the angle the lines drawn through the unbalances and their respective centers bear to any reference line.

Of course, if the system such as shown in FIGURE 6 is to be employed in the camera, it is desirable that the sum of the rotational inertia of the disks 15c, 16c, 19c and gear 18 equal the total rotation inertia of the driving element 21c and galvanometer coil, which rotate in an opposite direction thereto, as set forth in the above-identified copending application Serial No. 677,865, now Patent No. 2,841,064.

It is considered necessary in order to provide the counterbalance hereinabove discussed, that the counterbalancing rotary member bear a direct drive relationship with the counterbalanced member and rotate simultaneously with it in the same direction. If the ratio of gearing is provided other than a one-to-one drive relationship, a line drawn through the unbalanced center of gravity at its center of rotation would not remain constantly parallel with the line drawn through the counterbalancing weight and its center of rotation and, accordingly, the instantaneous balance of the system would be correct if only a limited number of positions of the parts.

Assuming, however, that the angular velocity of rotation of the two parts intended to balance each other are the same and the counterbalancing weight is initially arranged with the parallel opposed relationship above described, completely effective counterbalance is achieved.

Figure 7:
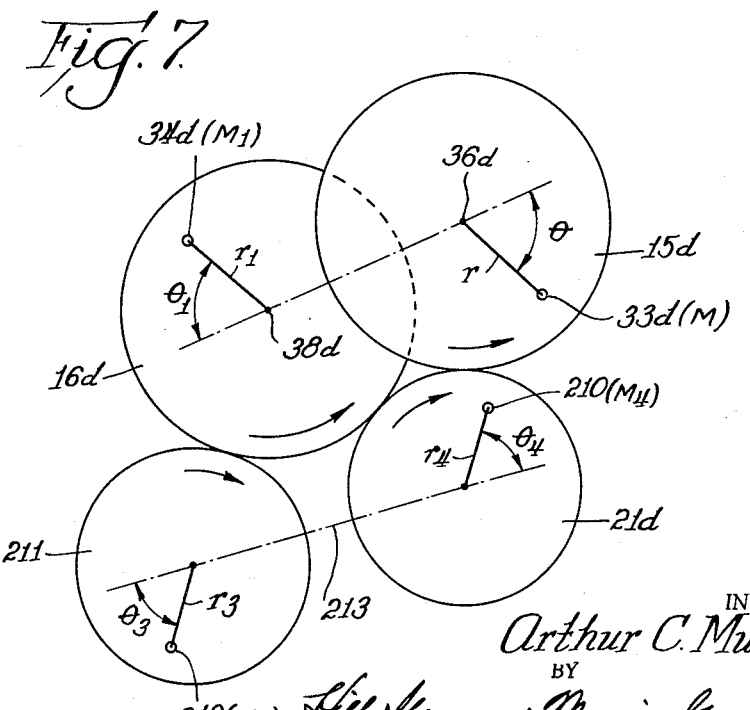
FIGURE 7 is still a further modified form of the invention illustrated diagrammatically.

Of course, it will be apparent from the above consideration that the balanced rotating system may be provided in which more than one unbalanced condition is effectively counterbalanced. In providing a satisfactory counterbalance, each of the unbalanced centers of gravity is preferably independently counterbalanced. Such an arrangement is shown in FIGURE 7 where disks 15d and 16d are directly driven by gear 21d and where disk 15d has an unbalance center of gravity 33d rotational relative to the center 36d. The unbalance 33d is counterbalanced effectively by a counterbalancing center of gravity 34d rotatable about the center of rotation 38d. This balancing is accomplished in the same manner as described above in connection with FIGURES 4, 5 and 6. However, in addition to the unbalance found in disk 15d a second unbalance is provided in the drive gear 21d at 210. For the reasons advanced above, it is necessary to balance the unbalanced center of gravity 210 by a corresponding mass rotating in the same direction at the same angular velocity somewhere else in the rotative system, assuming that the counterbalancing mass cannot conveniently be provided on the gear 21 itself diametrically opposed to the indicated position of the unbalance 210. Since neither of the discs 15d or 16d rotate in the same direction of rotation as gear 21 it is necessary to provide an additional rotating member 211. This gear 211 is, in the embodiment shown, drivingly associated with one or the other of the disks 15d, 16d to provide a direction of rotation identical to that of 21d, although it will be understood that gear 211 may be connected drivingly with any gear in turn drivingly associated with gear 21d as long as gear 211 rotates in the same direction and angular velocity as gear 21d. A counterbalance 212 is then provided which individually counterbalances the unbalanced center of gravity 210 of gear 21d in the same manner as hereinabove described relative to the disks 15 and 16. Thus the angle $\theta_3 =$ angle $\theta_4$ where the center line 213 is used as a base reference for convenience. Likewise, the counterbalance mass 212 ($M_3$) times the radius $r_3 =$ the unbalanced center of gravity mass 210 ($M_4$) times $r_4$ providing the above-mentioned relationship with $M_3 r_3 \cos \theta_3 + M_4 r_4 \cos \theta_4 = 0$ with $\cos \theta_3$ and $\cos \theta_4$ being of opposite sign.

In the arrangement illustrated in FIGURE 7 it will be seen that lines drawn through the various eccentric centers of gravity and their respective centers of rotation are not all parallel. However, in each case, the members effectively balancing each other do embody the parallel relationship at all times. As a result, the system as a whole is balanced as long as each unbalance therein is provided at some point in the system with a corresponding counterbalance having the relationship thereto above set forth. Of course, an unbalance may comprise a plurality of angularly spaced weights on a single rotating member and in some cases it may be desired that separate counterbalance be provided for each component weight rather than resolve the components into an effective resultant single unbalance and counterbalance it only. In such a case the individual unbalanced weights may of course be individually counterbalanced in the manner above set forth.

It will be appreciated by those skilled in the art that the counterbalancing system hereinabove set forth provides an arrangement whereby a part that cannot conveniently be balanced by a counter weight directly secured thereto in a position diametrically opposed to the unbalance may be counterbalanced elsewhere in a rotative system at a more convenient point. As a result, design flexibility is achieved and a camera such as that illustrated in FIGURES 1, 2 and 3 may be constructed employing a rather large unbalance in the form of an indicator flag without requiring a diametrically opposed counter weight. Actually, as shown, a reduction in weight at a point elsewhere in the system where such reduction would not weaken the indicator mechanism, such as at 42 in FIGURE 1 may be used instead. By the use of this novel balancing technique coupled with rotational inertia balance, a camera is provided which is substantially insensitive to external acceleration forces without the need for friction or other similar damping means which would simultaneously decrease the sensitivity of the diaphragm blades to forces applied by the galvanometer. In the present case, of course, the diaphragm blades are completely unrestricted and are actually preferably mounted in anti-friction jewel bearings, but in view of the rotational counterbalance and rotational inertia balance, external forces cannot impair the accuracy of diaphragm adjustment.

It will be apparent that the mechanism hereinabove described may be employed in motion picture cameras as well as still cameras of the type specifically illustrated. Likewise, variations and modifications may be made in the structure as set forth without departing from the scope of the novel concepts of the present invention and it is, accordingly, my intention that the invention be limited solely by the scope of the hereinafter appended claims.

I claim as my invention:

1. In a photographic camera, the combination comprising means forming an exposure aperture, a photoelectric cell, spring means, motor means having a rotative member driven in one direction by said photoelectric cell and in the opposite direction by said spring means, the relative angular position of said rotative member being determined by the relative output of said photoelectric cell, at least one additional rotative member directly connected to said first rotative member, at least two of said members being connected for rotation in opposite directions, at least two of said rotative members having diaphragm members with arcuate openings moving in overlapping relationship with the axes of the openings intersecting in front of said exposure aperture, said rotative members forming a rotative system in which the rotational inertias of the members connected for rotation in opposite directions act against and approximately balance each other rendering said diaphragm insensitive to external rotational accelerations without rendering the diaphragm members insensitive to movement by torque applied by said motor means or spring means, and in which an unbalance of any rotative member is balanced by one or more counterbalance components directly interconnected to the unbalanced member for rotation therewith in the same direction and at the same angular velocity and such that lines drawn through the center of gravity of each such counterbalance and the respective center of rotation thereof are constantly substantially parallel to a line drawn through the said unbalance and center of rotation thereof and in any given instantaneous position the unbalance and the counterbalance therefor are on opposite sides of their respective centers relative to any given reference line.

2. In a photographic camera, the combination comprising means forming an exposure aperture, a photoelectric cell, at least one rotary diaphragm member overlapping said exposure aperture for controlling the light passing therethrough and rotary drive means connected to said diaphragm member for rotation thereof, said drive means being actuated by variations in the output of said photoelectric cell whereby the output of said photoelectric cell controls the amount of light passing said exposure aperture, at least one additional rotative member connected to said first rotative member, at least two of said members being connected for rotation in opposite directions, said rotative members forming a rotative system in which the rotational inertias of the members connected for rotation in opposite directions act against and approximately balance each other rendering said diaphragm insensitive to external rotational accelerations without rendering the diaphragm insensitive to movement by torque supplied by said drive means and means counterbalancing any unbalance of any of said rotative members and comprising a rotary counterbalance directly interconnected to the unbalanced member for rotation therewith in the same direction and at the same angular velocity, the counterbalance thereof being positioned 180° out of phase with said unbalance.

3. A multi-element diaphragm system for photographic cameras comprising a rotational diaphragm member, means on said member causing a static unbalance providing an eccentric center of gravity, a separate rotary counterbalance member interconnected with said diaphragm member for rotation therewith in the same direction at the same angular velocity, said counterbalance having a center of gravity positioned 180° out of phase with the unbalance of said diaphragm member and balancing said system.

4. A multi-element diaphragm system for photographic cameras comprising a rotational diaphragm member, means on said member causing a static unbalance providing an eccentric center of gravity, a separate rotary counterbalance member interconnected with said diaphragm member for rotation therewith in the same direction at the same angular velocity, said counterbalance having a center of gravity positioned 180° out of phase with the unbalance of said diaphragm member and statically balancing said system, and rotary inertia balance means interconnected with said diaphragm and counterbalance for rotation therewith in opposite directions thereto and having a rotational inertia approximately equal to the sum of the rotational inertias thereof.

5. In a photographic camera, the combination comprising a pair of overlapping rotatable diaphragm members, drive means rotatably connected to said diaphragm members for rotation thereof to provide an adjustable diaphragm opening, means on one of said diaphragm members providing a static unbalance, and counterbalance means on the other of said diaphragm members providing a center of gravity thereof positioned 180° out of phase with said unbalance relative to a line drawn through the centers of rotation of said diaphragm members and statically balancing said diaphragm members.

6. In a photographic camera, the combination comprising a pair of overlapping rotatable diaphragm members, drive means rotatably connected to said diaphragm members for rotation thereof to provide an adjustable diaphragm opening, means on one of said diaphragm members providing a static unbalance, and counterbalance means on the other of said diaphragm members providing a center of gravity thereof positioned 180° out of phase with said unbalance relative to a line drawn through the centers of rotation of said diaphragm members and statically balancing said diaphragm members, said drive means being arranged to rotate in a direction opposite to the direction of rotation of said diaphragm members and having a rotational inertia approximately equalling the sum of the rotational inertias of said diaphragm members.

7. In combination in a photographic camera, an exposure aperture, a rotary diaphragm member overlapping said aperture for varying the light permitted to pass therethrough, a separate rotatable drive member connected to said diaphragm member for rotation, thereof and in the opposite direction thereto, means on one of said rotatable members causing a static unbalance providing an eccentric center of gravity about its center of rotation, and a separate rotatable counterbalance member rotationally connected to said one member for rotation therewith in the same direction thereas, said counterbalance having an eccentric center of gravity approximately balancing the unbalance of said one member and positioned 180° out of phase therewith relative to a line drawn through the centers of rotation of said one member and said counterbalance member.

8. In combination in a photographic camera, an exposure aperture, a rotary diaphragm member overlapping said aperture for varying the light permitted to pass therethrough, a separate rotatable drive member connected to said diaphragm member for rotation thereof and in the opposite direction thereto, means on one of said rotatable members causing a static unbalance providing an eccentric center of gravity about its center of rotation, and a separate rotatable counterbalance member rotationally connected to said one member for rotation therewith in the same direction thereas, said counterbalance having an eccentric center of gravity approximately balancing the unbalance of said one member and positioned 180° out of phase therewith relative to a line drawn through the centers of rotation of said one member and said counterbalance member, said members comprising a rotational system wherein the rotational inertia of the members mounted for rotation in one direction approximately balance and is opposed to the rotational inertia of the members rotating in the opposite direction.

9. In a photographic camera, the combination comprising means forming an exposure aperture, a photoelectric cell, spring means, motor means having a rotative member driven in one direction by said photoelectric cell and in the opposite direction by said spring means, the relative angular position of said rotative member being determined by the relative output of said photoelectric cell, a pair of additional rotative members directly connected to said first rotative member for simultaneous rotation in opposition thereto and having diaphragm members with arcuate openings therein moving in overlapping relationship in front of said exposure aperture, indicator means connected to one of said diaphagm members and providing an eccentric center of gravity thereof, counterbalance means on the other of said diaphragm members providing for a balancing eccentric center of gravity positioned 180° out of phase with the center of gravity of said first diaphragm member relative to a line drawn through the centers of rotation of said diaphragm members, said rotative members forming a rotative system in which the rotational inertias of the members connected for rotation in opposite directions acts against and approximately balance each other rendering said diaphragm members insensitive to external rotational accelerations and in which the unbalance of said one diaphragm member is effectively counterbalanced against movement in response to gravitational or linear acceleration forces.

10. In a photographic camera, the combination comprising means forming an exposure aperture, a photoelectric cell, spring means, motor means having a rotative member driven in one direction by said photoelectric cell and in the opposite direction by said spring means, the relative angular position of said rotative member being determined by the relative output of said photoelectric cell, a pair of additional rotative members directly connected to said first rotative member for simultaneous rotation in opposition thereto and having diaphragm members with arcuate openings therein moving in overlapping relationship in front of said exposure aperture, indicator means connected to one of said diaphragm members and providing an eccentric center of gravity positioned 180° out of phase with the center of gravity of said first diaphragm member relative to a line drawn through the centers of rotation of said diaphragm members, said rotative members forming a rotative system in which the rotational inertias of the rotative member equals approximately the rotative inertias of the diaphragm members and acts against and approximately balances them, and in which the unbalance of said one diaphragm member is effectively counterbalanced against movement in response to gravitational or linear acceleration forces.

References Cited in the file of this patent

UNITED STATES PATENTS

| | | |
|---|---|---|
| 568,102 | Royle | Sept. 22, 1896 |
| 2,013,362 | Riszdorfer | Sept. 3, 1935 |
| 2,091,881 | Riszdorfer | Aug. 31, 1937 |
| 2,213,742 | Mihalyi | Sept. 3, 1940 |
| 2,297,262 | Tonnies | Sept. 29, 1942 |
| 2,465,578 | Czarnikow et al. | Mar. 29, 1949 |
| 2,821,891 | Gorey | Feb. 4, 1958 |
| 2,841,064 | Bagby et al. | July 1, 1958 |